3,554,937
PRODUCTION OF EXPANDED POLYAMIDES
Anton Cadus, Ludwigshafen (Rhine), and Klaus Benker, Konigsbach, Germany, assignors to Badische Anilin- & Soda-Fabrik Aktiengesellschaft, Ludwigshafen (Rhine), Germany
No Drawing. Filed July 8, 1968, Ser. No. 743,052
Claims priority, application Germany, July 8, 1967, 1,669,706
Int. Cl. C08f 47/10; C08j 1/20
U.S. Cl. 260—2.5                    8 Claims

ABSTRACT OF THE DISCLOSURE

Expanded polyamides and a process for ther production by discharging mixtures of polyamides and hydrazodicarboxylic esters from equipment having a conveying or mixing action.

---

This invention relates to a process for the production of expanded polyamides using specially advantageous expanding agents.

It is known that expanded polyamides can be produced by heating the polyamide to a temperature above the softening point of the polyamide together with substances which form gaseous products when heated, i.e. in a temperature range in which the polyamides are present in the plastic condition. These substances may be added before, during or after the polycondensation of the polyamide-forming starting materials. Many of the substances which form gaseous products when heated either have the disadvantage that they do not decompose until they reach a temperature at which the polyamide is thermally damaged, or the disadvantage that they form gaseous substances at too low a temperature or are already present as gases so that expanded materials formed therewith have an irregular pore structure.

We have now found that expanded synthetic polyamides having recurring amide groups as integral parts of the main molecular chain can be prepared particularly advantageously by discharging a heated mixture of a polyamide and a substance which forms gaseous products when heated from equipment having a conveying or mixing action by using as the substance which forms gaseous products when heated a hydrazodicarboxylic ester having the formula: R—OOC—N—N—COO—R$^1$, in which R and R$^1$ denote monohydric alcohol radicals.

Aliphatic and araliphatic hydrazodicarboxylic esters and mixtures of such compounds may be used. Hydrazodicarboxylic esters of alkanols such as methyl alcohol and ethyl alchol are particularly suitable.

Expansion periods are very short.

The hydrazodicarboxylic esters are used in accordance with this invention in amounts of 1 to 20%, preferably 2 to 10%, by weight with reference to polyamide.

Examples of synthetic polyamides having recurring amide units as integral parts of the main molecular chain which may be expanded according to this invention are polylactams, such as polycaprolactam, polycapryllactam, polylaurolactam or polyoenantholactam, nylon 6,6, nylon 6,10, nylon 6,12 or poly-11-aminoundecanoic acid and also mixtures or copolycondensates of the polyamide-forming starting materials on which the polyamides are based. Polyamides having molecular weights such as are obtained by conventional polycondensation methods and also those whose molecular weights have for example been increased by tempering. It is surprising that polyamides having a relatively low K value of from 70 to 74 (according to H. Fikentscher, Cellulosechemie, 13, 58 (1932)) can be expanded by the process according to this invention whereas according to prior art methods for the production of expanded polyamides, polyamides having K values of about 85 or more are required. The polyamides may contain conventional additives, such as antioxidants, dyes, ultraviolet absorbents, fillers, antistatics, plasticizers, flame retardants and/or glass fibers.

The polyamides may be mixed in cominuted form with the hydrodicarboxylic esters serving as expanding agent. It is, however, preferable to add the hydrazodicarboxylic ester to the molten polyamide which is being mixed by equipment having a mixing or conveying action. The temperature in the equipment is from 220° to 320° C., preferably from 230° to 280° C. In special cases it may also lie outside the said ranges.

The process is advantageously carried out continuously. Screw machines capable of being heated and of conventional design are particularly suitable for the purpose. Batch type equipment, such as heated presses or injection molding machines, is also suitable.

Other materials may be coated with the expanded polyamide or the expanded polyamides may be conveyed suitably supported, for example on endless belts or rotating cylinders. The expanded moldings, in the form of stands, film, sheeting boards or sections, may be removed by allowing them the drop under their own weight, for example through vertical shafts.

Expanded polyamides having uniform structure are obtained in all cases. The K value of the polyamides is substantially unchanged by the expansion. Since the decomposition temperatures and decomposition periods of the aliphatic and/or araliphatic hydrazo esters used as additives to this invention can be determined very accurately and lie within narrow limits, it is possible to control the course of the reaction very closely by using these compounds. It is possible in this way to prepare polyamide expanded materials having a great variety of unit weights. The polyamide foam materials are particularly suitable for the production of lightweight load-bearing elements because of their high mechanical strength. Owing to their high resistance to heat, they may be used with advantage for insulating purposes at temperatures at which other expanded materials would already be destroyed.

The invention is illustrated by the following examples. The percentages specified in the examples are by weight.

EXAMPLE 1

100 parts of polycaprolactam (K value 71.6) is mixed well with 0.3 part of calcium stearate and 2.0 parts of the diethyl ester of hydrazodicarboxylic acid in a high speed mixer, fused in a twin screw kneader at 220° C. and extruded. The completely colorless expanded polyamide has a density of about 200 g./liter and may be withdrawn in strip or strand form.

EXAMPLE 2

100 parts of polyhexamethylene adipamide (K value 72.1) is mixed well with 0.1 part of butanediol-1,4 and 0.1 part of calcium stearate and melted at 260° C. in the twin screw kneader. 4 parts of diethyl hydrazodicarboxylate is metered into the melt. The hydrazo ester is intimately mixed with the melt in an extruder and the very pale expanded polyamide is introduced into an injection mold. The injection molding has a specific gravity of 0.2 to 0.3 g./ccm.

EXAMPLE 3

100 parts of polyhexamethylene sebacamide (K value 70.8) is fused with 0.2 part of calcium stearate, 0.1 part of butanediol-1,4 and 0.2 part of carbon black in a twin screw kneader at 225° C. 5.0 parts of the dimethyl ester of hydrazodicarboxylic acid is metered in before the final mixing unit and the expanded polymer is discharged as a continuous strip having a specific gravity of 0.25 g./ccm.

EXAMPLE 4

100 parts of polycaprolactam is mixed with 0.5 part of calcium stearate, melted and glass fibers are worked into the polyamide melt. 6 parts of the diethyl ester of hydrazodicarboxylic acid is then supplied to the melt through metering equipment and the expanded polyamide reinforced with glass fibers is discharged as a strand.

EXAMPLE 5

Polycaprolactam is melted with corresponding additives as in Example 1 but the glass fibers are not added until after the addition of the diethyl hydrazodicarboxylate to the polyamide melt. An expanded polyamide having somewhat coarser pores is formed.

We claim:

1. In a process for the production of an expanded synthetic polyamide having recurring amide groups as integral parts of the main molecular chain by discharging a heated mixture of a polyamide and a substance which forms gaseous products when heated from equipment having a conveying or mixing action, the improvement which comprises discharging a heated mixture of a polyamide and, as the substance which forms a gaseous product when heated, an ester of a hydrazodicarboxylic acid having the formula

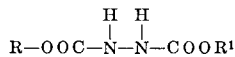

in which R and R¹ each denote a monohydric alcohol radical.

2. A process as claimed in claim 1 wherein said mixture comprises a polyamide and, as the substance which forms a gaseous product when heated, and alkanol ester of a hydrazodicarboxylic acid.

3. A process as claimed in claim 1 wherein said mixture comprises a polyamide and, as the substance which forms gaseous products when heated the dimethyl ester of a hydrazodicarboxylic acid.

4. A process as claimed in claim 1 wherein said mixture comprises a polyamide and, as the substance which forms gaseous products when heated the diethyl ester of a hydrazodicarboxylic acid.

5. A process as claimed in claim 1 wherein the hydrazodicarboxylic ester of said mixture is used in an amount of 1 to 20% with reference to the weight of polyamide.

6. A process as claimed in claim 1 wherein the polyamide used is polycaprolactam.

7. A process as claimed in claim 1 wherein the polyamide used is polyhexamethylene adipamide.

8. A process as claimed in claim 1 wherein the polyamide used is polyhexamethylene sebacamide.

No references cited.

MURRAY TILLMAN, Primary Examiner

M. FOELAK, Assistant Examiner

U.S. Cl. X.R.

260—37, 482